(12) United States Patent
Fitch et al.

(10) Patent No.: US 7,970,658 B1
(45) Date of Patent: Jun. 28, 2011

(54) SYSTEMS AND METHODS FOR ITEM VALUATION AND MARKETPLACE

(75) Inventors: Todd M. Fitch, Santa Clara, CA (US); Michael J. Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 749 days.

(21) Appl. No.: 11/961,786

(22) Filed: Dec. 20, 2007

(51) Int. Cl.
*G06Q 30/00* (2006.01)

(52) U.S. Cl. ....... 705/26.1; 705/27.1; 705/31; 705/36 T; 705/37

(58) Field of Classification Search ............ 705/26, 705/27, 31, 37, 36 T
See application file for complete search history.

(56) References Cited

U.S. PATENT DOCUMENTS

| | | | | |
|---|---|---|---|---|
| 6,085,176 | A | * | 7/2000 | Woolston ............... 705/37 |
| 7,305,353 | B1 | * | 12/2007 | Foley et al. ............ 705/19 |
| 2002/0133436 | A1 | * | 9/2002 | Hermreck et al. ...... 705/31 |
| 2004/0138969 | A1 | * | 7/2004 | Goldsmith et al. ..... 705/30 |
| 2005/0246265 | A1 | * | 11/2005 | McHale et al. ........ 705/37 |

OTHER PUBLICATIONS

"Determining Worth of Donated Vehicle to Charity Presents Challenge," by Rick Popely, Knight Ridder Tribune Business News, Washington: Mar. 21, 2002, p. 1.*

"ItsDeductible FAQs," Website, http://web.archive.org/web/20061222184649/http://www.jacksonhewitt.com/?ProductsItsDeductibleFAQs, Web Archive Dated Dec. 22, 2006.

"eBay Developers Program," Website, http://web.archive.org/web/20070407011100/http://developer.ebay.com/programs/marketdata/, Web Archive Dated Apr. 7, 2007, article states "last modified Aug. 24, 2006."

* cited by examiner

*Primary Examiner* — Yogesh C Garg
*Assistant Examiner* — Anne M Georgalas
(74) *Attorney, Agent, or Firm* — Osha • Liang LLP

(57) ABSTRACT

In various embodiments, sellers and buyers may interact with a price determination application and/or electronic marketplace to buy/sell items for tax deductions to increase the tax deduction benefit for the sellers and buyers. For example, donating an item may have a tax benefit to a seller that is less than the tax benefit to a higher income bracket buyer. The electronic marketplace may facilitate a sale of the items to the buyer who may then donate the items for the tax benefit. In some embodiments, an item distribution service may sell items from multiple sellers to buyers according to a calculated price/distribution to increase the tax benefit to the sellers/buyers. In some embodiments, the items may not be delivered to the buyer by the seller, but may instead be routed to a charitable organization for donation in the buyer's name after ownership is transferred to the buyer.

10 Claims, 14 Drawing Sheets

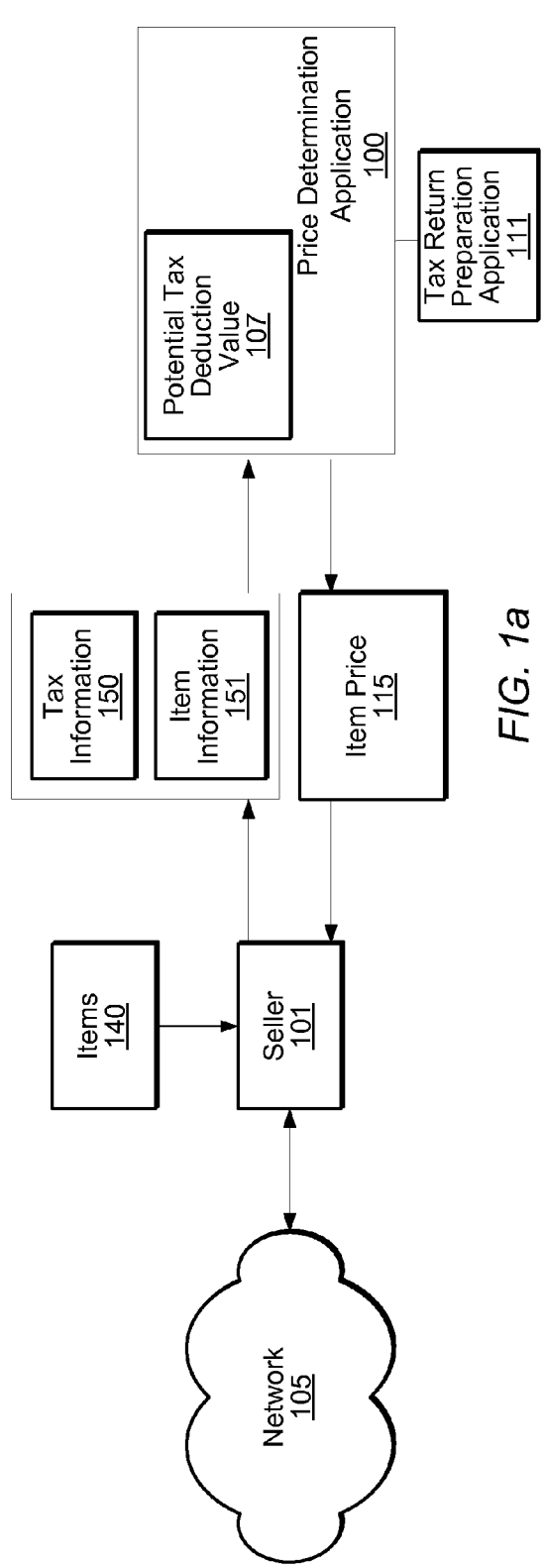
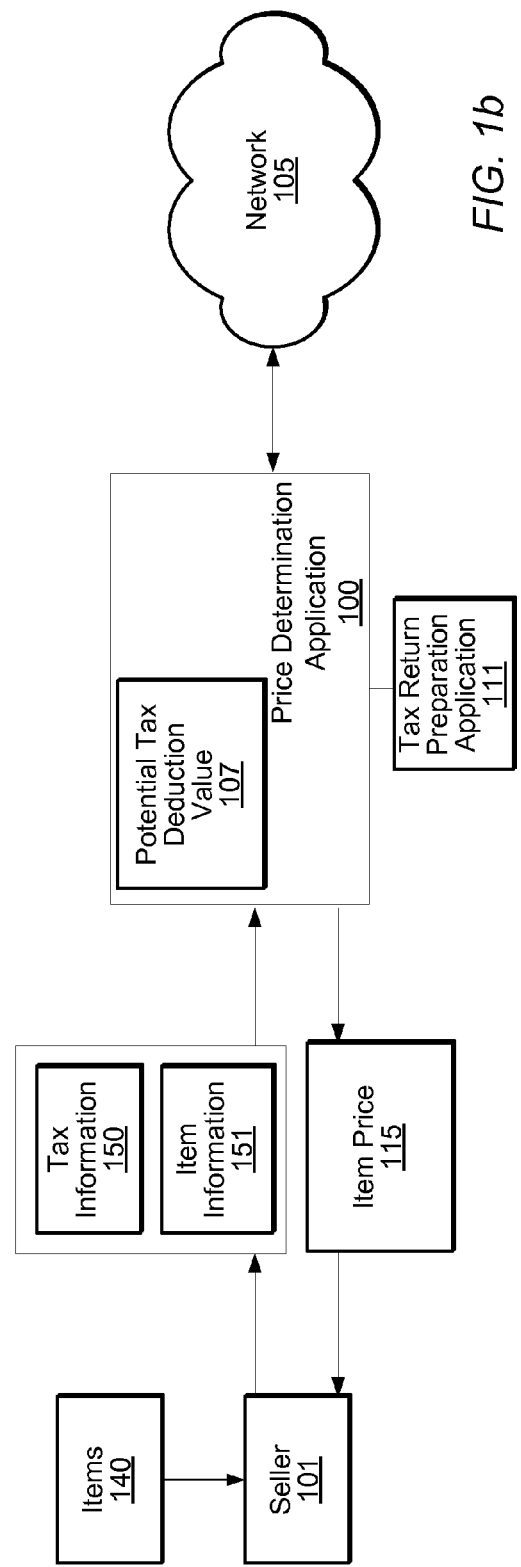

Itemization #7

| Items | Market Value |
|---|---|
| Clothes | |
| Blue Sweater | $10 |
| Red Coat | $15 |
| Athletic Running Shoes | $12 |
| Men's Suit (Good Condition) | $45 |

505           507

| | |
|---|---|
| Appliances | |
| Blender | $7 |
| Analog Television | $50 |
| VCR | $15 |
| | |
| Office Equipment | |
| Computer | $225 |
| LCD Monitor | $75 |
| Office Chair (Good Condition) | $20 |
| Total: | $474 |

Itemization Summary for Buyer #345

| Itemization | Market Value | Tax Deduction Value |
|---|---|---|
| Itemization #1 | $50.00 | $17.50 |
| Itemization #2 | $74.00 | $25.90 |
| Itemization #3 | $92.00 | $32.20 |
| Itemization #4 | $150.00 | $52.50 |
| Itemization #5 | $189.00 | $66.15 |
| Itemization #6 | $240.00 | $84.00 |
| Itemization #7 | $474.00 | $140.00 |
| Itemization #8 | $589.00 | $206.15 |
| Itemization #9 | $700.00 | $245.00 |
| Itemization #10 | $2,200.00 | $770.00 |
| Itemization #11 | $3,900.00 | $1,365.00 |
| Itemization #12 | $7,200.00 | $2,520.00 |

*FIG. 6*

| Item Listing | Market Value | Tax Information | | | |
|---|---|---|---|---|---|
| Item Type | Condition | Age | Other | Skip | |

Name of Items:

Upload Item Listing?: [Yes] [No]

Item #1: [_____]

Item #2: [_____]

Additional Items? [Yes] [No]

[< Back]

FIG. 7

Chart of Tax Deduction Values

|  | Item 1 | Item 2 | Item 3 | Item 4 |
|---|---|---|---|---|
| Buyer 1 | $A | $B | $C | $D |
| Buyer 2 | $J | $K | $L | $M |
| Buyer 3 | $W | $X | $Y | $Z |

SYSTEMS AND METHODS FOR ITEM VALUATION AND MARKETPLACE

BACKGROUND

Entities may often realize a tax benefit from donating items to a qualified tax deduction organization such as a charity. Entities may donate valuable or inexpensive items. Entities will often donate items to charity that are not otherwise easy to sell. For example, items such as old clothes, obsolete appliances/electronics, etc. may not be easy to sell for their marketplace value, and, therefore, the items may instead be donated to capture the tax benefit of the donation. Other items, such as cars, office equipment, etc. may also be donated. Donated items may not provide the same tax benefit to everyone. For example, a donated item may provide a larger tax benefit to an entity in a higher tax bracket than to an entity in a lower tax bracket. In addition, if an entity does not have enough donations to itemize their donations, then the donated items may not provide any tax benefit.

SUMMARY

In various embodiments, a price determination application may use tax information from a user to calculate a value of one or more items to the user as a tax donation. The value of the tax donation may then be used to determine a price for selling and/or buying the one or more items. In some embodiments, the price determination application may execute on a computer system local to the user (e.g., as part of a tax return preparation application) and/or may execute on a computer system accessible to the user over a network. For example, the price determination application may work in conjunction with an electronic marketplace (e.g., an online auction service). Other processing distributions are also contemplated.

In various embodiments, sellers and buyers may use the price determination application and/or interact with the electronic marketplace to buy/sell items for tax deductions to realize increased tax deduction benefits for donating the items. For example, donating an item may have a tax benefit to a seller that is less than the tax benefit to a higher income bracket buyer. In some embodiments, the electronic marketplace may provide a web application for posting itemizations (of items for donation) from sellers for potential offers from buyers. The electronic marketplace may facilitate a sale of the items from the seller to the buyer who may then donate the items for the tax benefit. In some embodiments, the items may not be delivered to the buyer by the seller, but may instead be routed to a qualified tax deduction organization (e.g., a charity) for donation in the buyer's name after ownership is transferred to the buyer.

In some embodiments, an item distribution service may use the price determination application to determine a favorable distribution of a group of items among a plurality of buyers. For example, the item distribution service may receive items and/or item information from a plurality of sellers to determine a favorable distribution of the items among the plurality of buyers for a total tax deduction that exceeds a total tax deduction of the items if the items had been donated by the original sellers. In some embodiments, the item distribution service may use the price determination application to determine prices for the distribution. In some embodiments, the item distribution service may be a tax return preparation entity that prepares tax returns for sellers and buyers. The item distribution service may then facilitate sales, transfers of ownerships, and donations of the items to the respective sellers and buyers as determined by the determined distribution.

In some embodiments, the payment received from the buyers of the items may be distributed among the sellers (e.g., according to the value of the items supplied by the respective sellers).

BRIEF DESCRIPTION OF THE DRAWINGS

FIGS. 1a-1d illustrate embodiments of users interacting with a price determination application, according to one or more embodiments of the invention.

FIG. 5 illustrates an itemization summary, according to an embodiment.

FIG. 6 illustrates a specific itemization, according to an embodiment.

FIG. 7 illustrates a user interface, according to an embodiment.

Figure 1C:
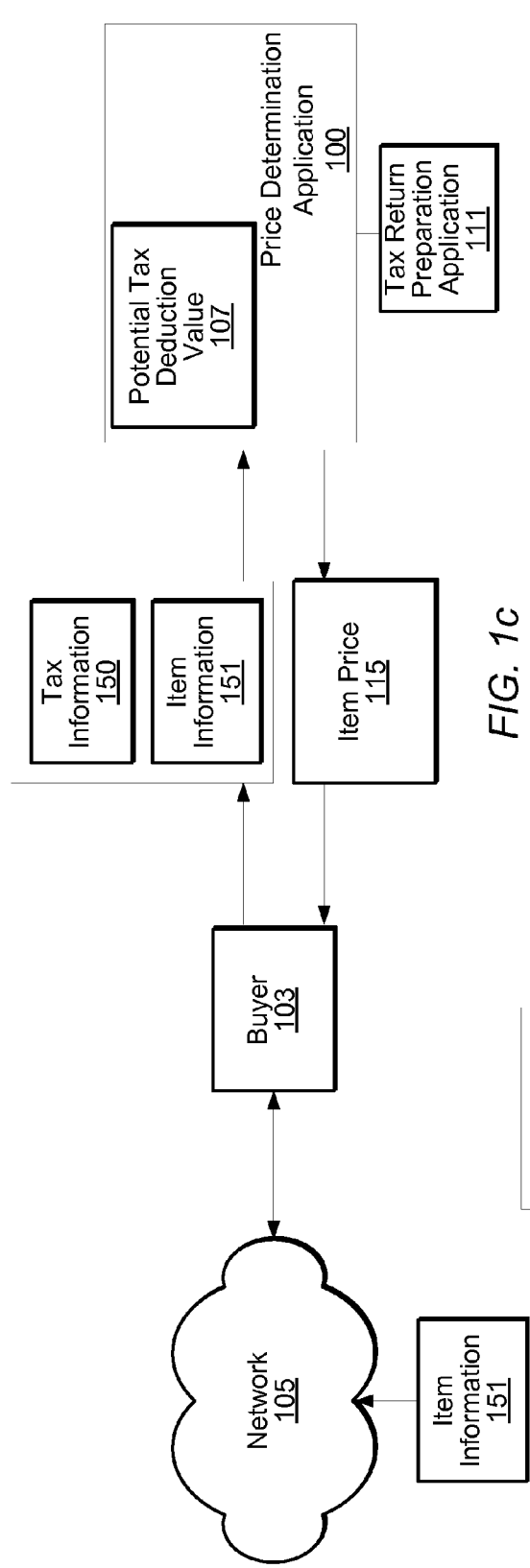

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF EMBODIMENTS

FIGS. 1a-d illustrate embodiments of users interacting with a price determination application 100, according to an embodiment. In some embodiments, the price determination application 100 may use tax information 150 from a user (e.g., a seller 101 or buyer 103) to calculate a value of one or more items 140 to the user as a tax donation. In some embodiments, the price determination application 100 may be part of a tax return preparation application 111 (e.g., TurboTax™). Tax information 150 (e.g., approximate income, current deductions, etc.) may be derived from last year's tax return or from data in the current year's tax return. Other tax information sources are also contemplated. The value of the tax donation may be used by the price determination application 100 to determine a suggested price 115 to sell and/or buy the items 140 (e.g., on an electronic marketplace 300 such as an online auction service). As used herein, "sellers" may include entities that supply one or more items 140 for donation and "buyers" may include entities that purchase the one or more items 140 for donation. Sellers 101 and buyers 103 may include taxpayers (e.g., individual taxpayers, businesses, etc.). In some embodiments, a buyer 103 may also interact as a seller 101 (and vice versa).

FIGS. 1a-b illustrate various interactions between a seller 101 and the price determination application 100, according to various embodiments. In some embodiments, the seller 101 may provide the price determination application 100, e.g., executing on the seller's local computer system, with item information 151 (based on items 140 that the seller 101 is interested in selling or donating) and tax information 150. The price determination application 100 may calculate a potential tax deduction value 107 of the items 140 (if donated by the seller 101) and use the potential tax deduction value 107 to determine a suggested item price 115 for the seller 101 to use in selling the items 140. Other uses of the item price 115 are also contemplated. In some embodiments, as seen in FIG. 1a, the seller 101 may interact, for example, with an auction site over the network 105 and may use the item price 115 as a reserve price. In some embodiments, as seen in FIG. 1b, the seller 101 may interact with, for example, an auction site on a network 105 through the price determination application 100.

Figure 1D:
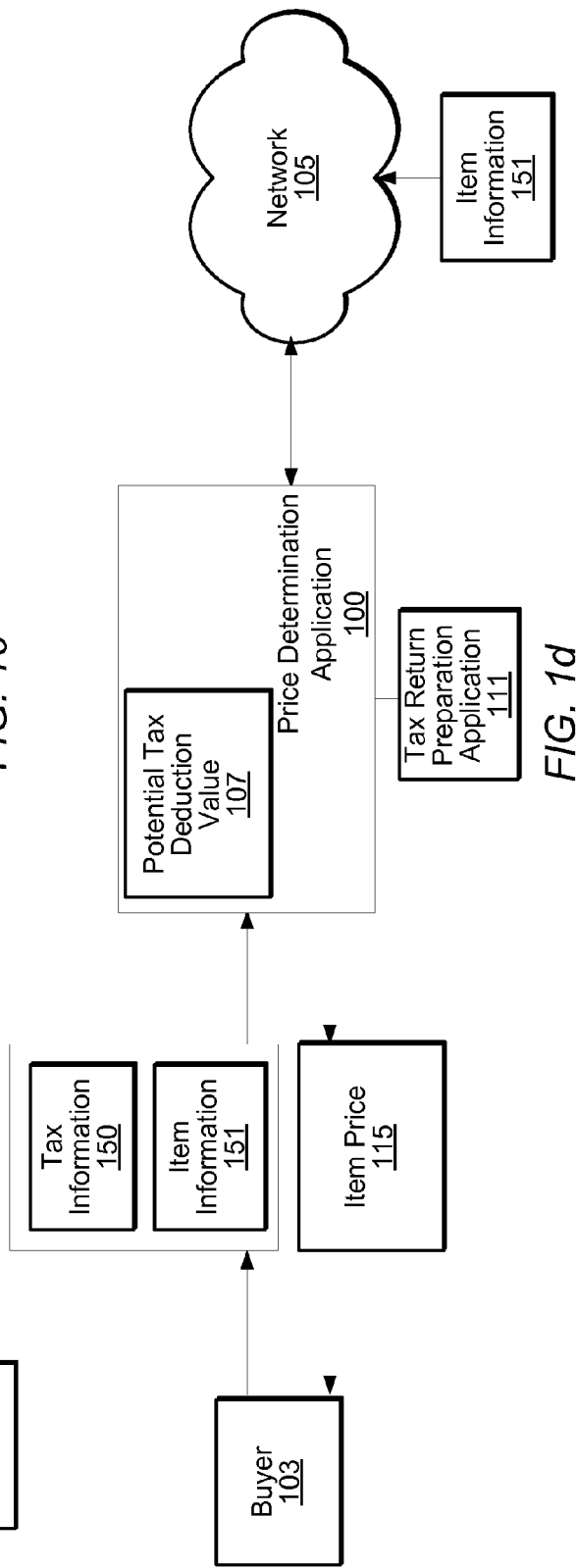

FIGS. 1c-d illustrate various interactions between a buyer 103 and the price determination application 100, according to various embodiments. In some embodiments, the buyer 103 may provide the price determination application 100, e.g., executing on the buyer's local computer system, with item information 151 (based on items 140 that the buyer 103 is interested in buying for a potential donation) and tax information 150. In some embodiments, as seen in FIG. 1c, the buyer 103 may receive the item information 151 from, for example, an auction site over network 105. The buyer 103 may then provide the item information 151 to the price determination application 100. In some embodiments, as seen in FIG. 1d, the price determination application 100 may access the item information 151, for example, from an auction site over network 105. In some embodiments, the item information 151 may be accessed automatically or at the buyer's direction. The price determination application 100 may then calculate a potential tax deduction value 107 of the items 140 (if donated by the buyer 103) and use the potential tax deduction value 107 to determine a suggested item price 115 for purchasing the items 140. In some embodiments, as seen in FIG. 1c, the buyer 103 may interact, for example, with the auction site over the network 105 and may use the item price 115 as a bid price. In some embodiments, as seen in FIG. 1d, the buyer 103 may interact with, for example, an auction site on network 105 through the price determination application 100 to make a bid. Other interaction configurations are also contemplated.

Figure 2:
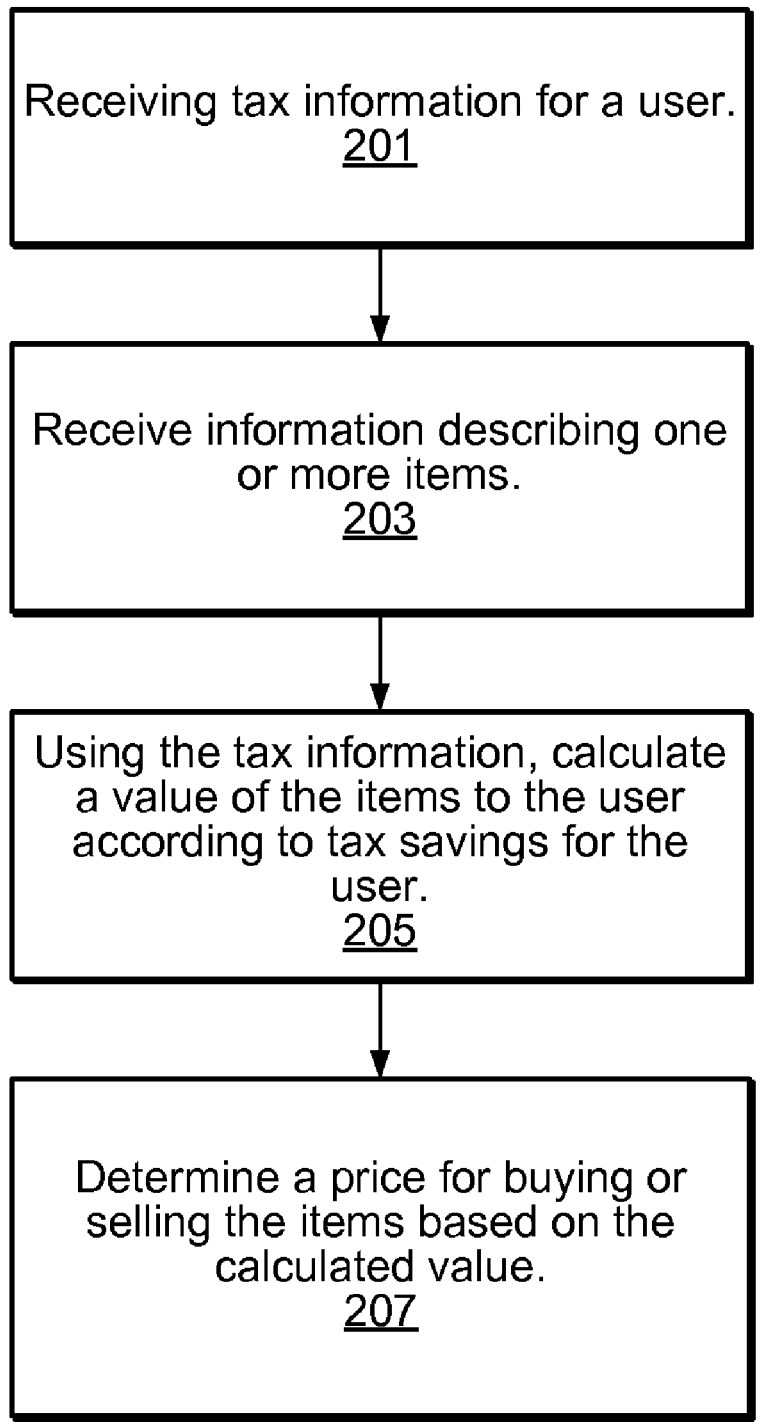
FIG. 2 illustrates a flowchart of an embodiment of a price determination application.
Figure 3A:
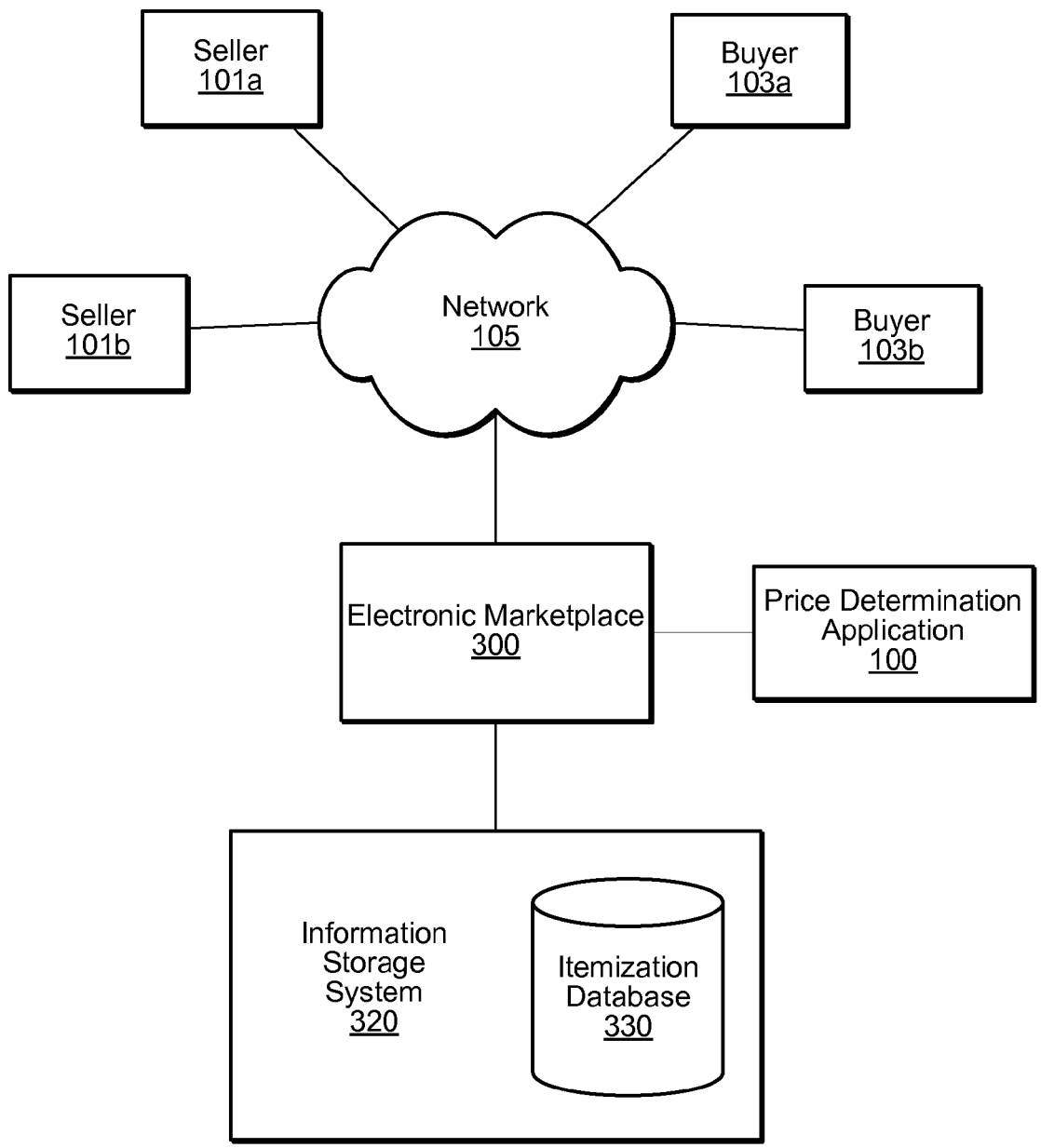
FIGS. 3a-3d illustrate interactions between buyers and sellers through the electronic marketplace, according to one or more embodiments of the invention.
Figure 3B:
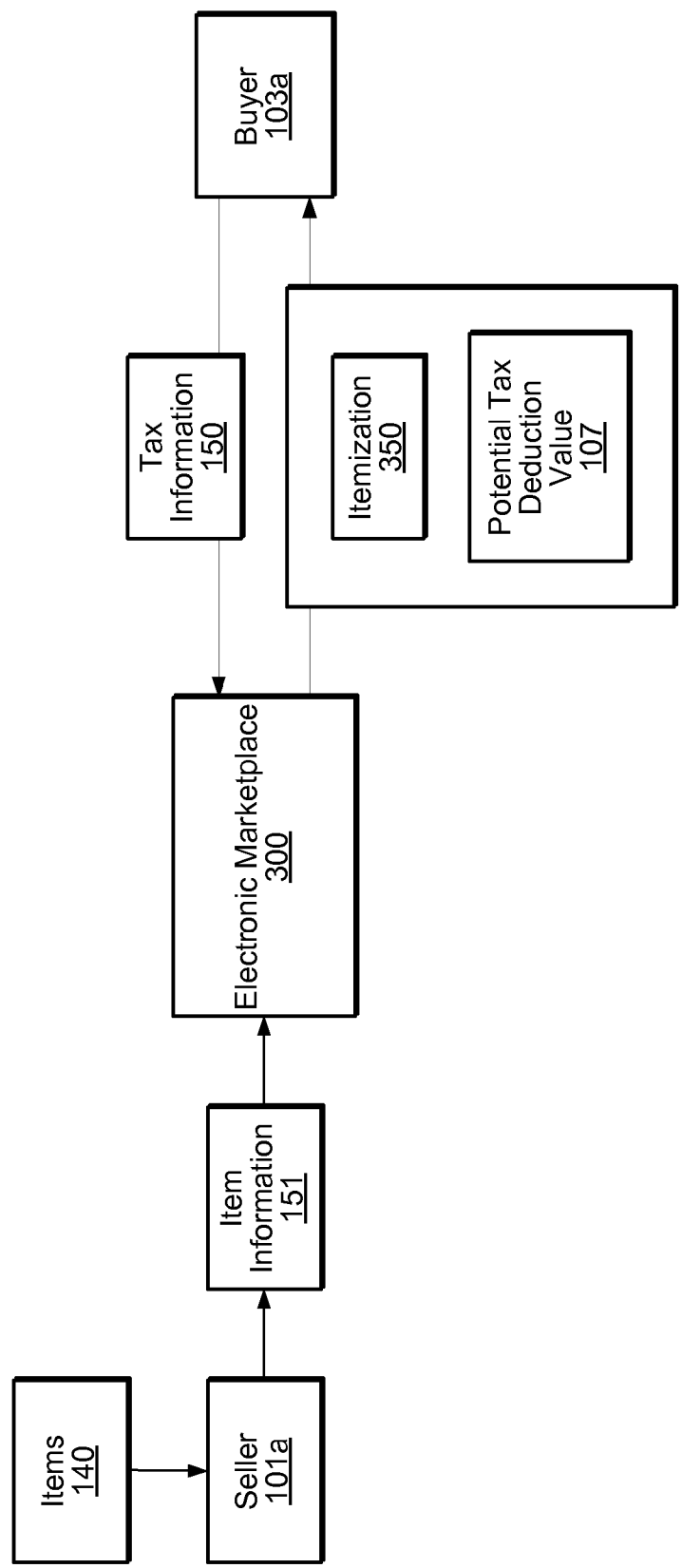
Figure 3C:
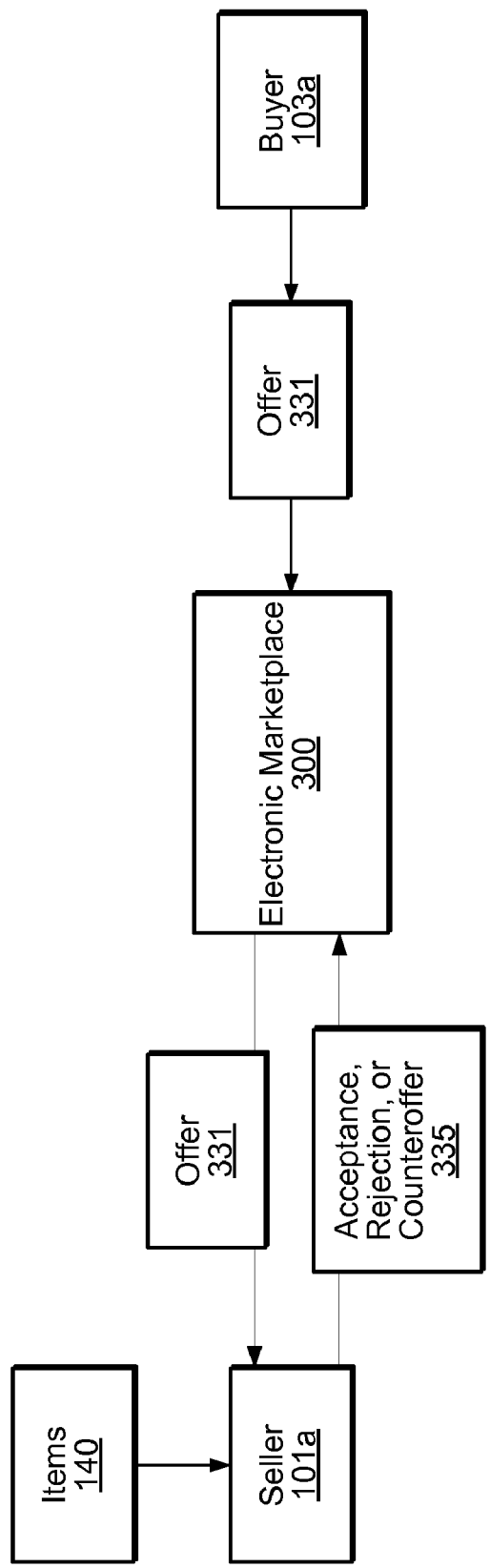
Figure 3D:
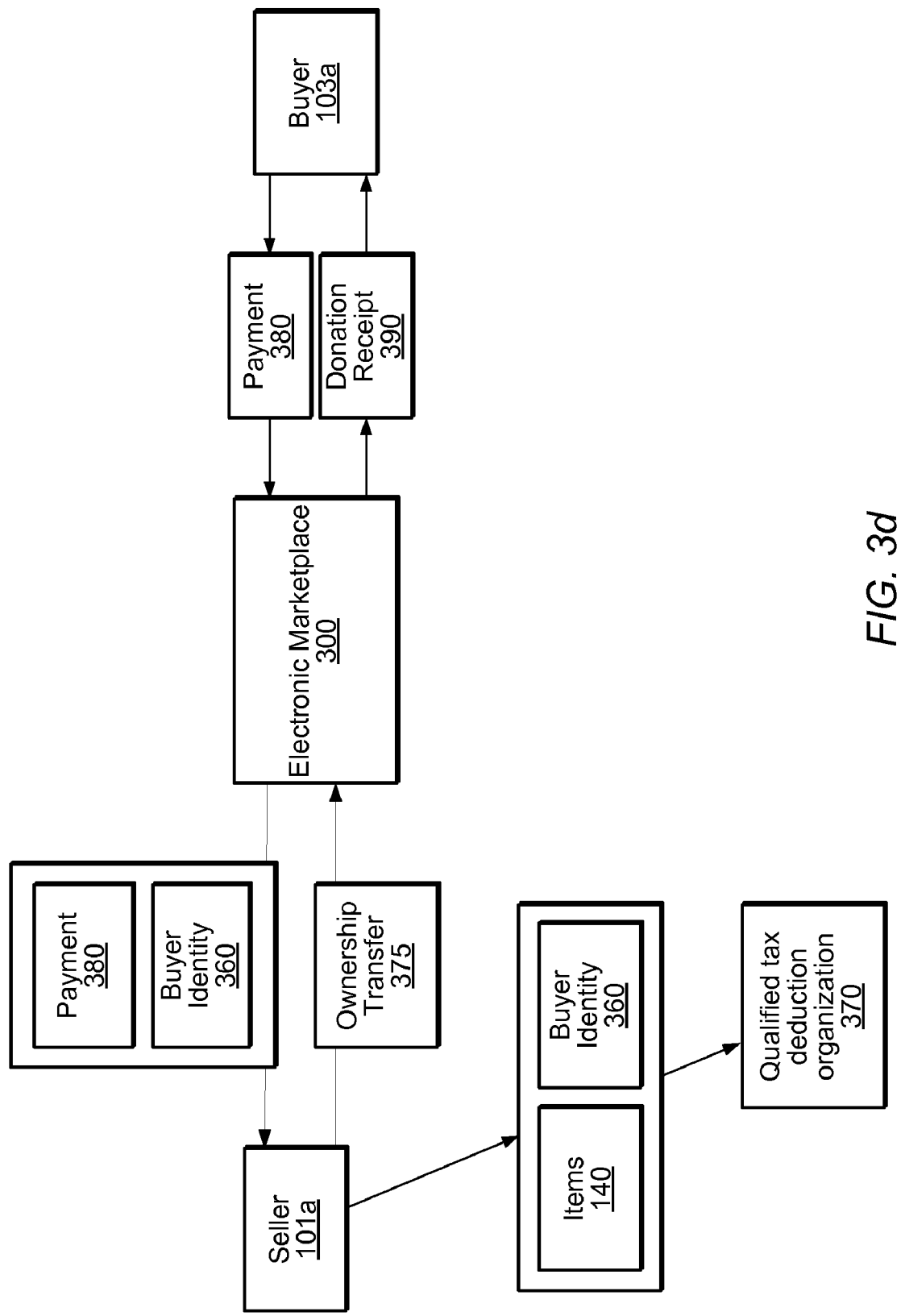

FIG. 2 illustrates a flowchart of an embodiment of a price determination application 100. It should be noted that in various embodiments of the methods described below, one or more of the elements described may be performed concurrently, in a different order than shown, or may be omitted entirely. Other additional elements may also be performed as desired. In some embodiments, one or more elements may be performed by a price determination application 100 executing on a computer system local to a user and/or may be performed on a computer system accessible to the user over a network 105. Other processing distributions are also contemplated.

At 201, tax information 150 may be received from a user (e.g., a seller 101 or buyer 103). In some embodiments, the tax information 150 may be provided by the user to the price determination application 100 (e.g., uploaded and/or through a user interface 701 as seen in FIG. 7). In some embodiments, the price determination application 100 may have access to the tax information 150 through a tax return preparation application 111 the user is using to prepare a tax return. Tax information 150 (e.g., approximate income, current deductions, etc.) may be derived from last year's tax return or from data in the current year's tax return. Other tax information sources are also contemplated.

At 203, information (e.g., item information 151) describing one or more items 140 may be received. In some embodiments, the item information 151 may be provided by the user to the price determination application 100 (e.g., uploaded and/or through a user interface 701). Item information 151 may include item description, age, estimated market value, item picture, etc. for various items 140. Items 140 may include clothes, appliances, electronics, automobiles, etc. In some embodiments, items 140 may include items 140 that are difficult to sell for their respective market value (e.g., old clothing). Other items 140 are also contemplated. In some embodiments, the item information 201 may be received over a network 105 (e.g., from an auction site). Other sources of item information 151 are also contemplated. In some embodiments, the item information 151 may include an itemization (e.g., itemization 350 in FIG. 4) or the price determination application 100 may itemize the received item information 151.

At 205, the price determination application 100 may use the tax information 151 to calculate a potential tax deduction value 107 of the one or more items 140 to the user according to tax savings for the user if the one or more items 140 were donated and claimed as a charitable donation on a tax return for the user. In some embodiments, the potential tax deduction value 107 may depend on the market value 507 of the items 140 and the user's tax information (e.g., indicating which tax bracket the user is in). For example, if the items 140 have a market value of $100 and the user pays 20% income tax, the potential tax deduction value of donating the items 140 may be approximately $20 to the user (e.g., 0.2*$100). In some embodiments, the market value 507 may be calculated for the items 140 using an application-based appraisal (e.g., ItsDeductable™) and/or published charts/listings of approximate market values 507. Other sources of market values 507 are also contemplated (e.g., appraisal values, consignment store values, online auction site valuations associated with similar recently auctioned items). In some embodiments, the potential tax deduction value 107 may be $0. For example, if the user does not have enough items 140 to itemize over a standard deduction, the items 140 may have a tax deduction value 107 of $0 to the user. In some embodiments, the price determination application 100 may consider other items the user may potentially donate in determining the potential tax deduction value 107 to the user. For example, the tax deduction value 107 of a first item alone may be $0 to the user, but when combined with one or more second items (such that a user's itemization threshold is surpassed), the tax deduction value 107 of the first item may be greater than $0. For sellers 101, the price determination application 100 may consider other already donated items (or items that may potentially be donated) included in the seller's current tax return when determining the tax deduction value 107 of an item to the user. For buyers, the price determination application 100 may consider other already donated items included in the buyer's current tax return and other items the buyer may potentially purchase for donation when determining the tax deduction value 107 of an item 140 to the buyer 103. In some embodiments, the price determination application 100 may provide the buyer 103 with values associated with bundles of potential items 140 to purchase for donation (e.g., a chart showing the tax deduction value 107 (and/or suggested price 115) for one item, a tax deduction value 107 (and/or suggested price 115) for two items, etc.). In some embodiments, the price determination application 100 may determine an approximate state and/or federal income tax deduction value 107 to the buyer 103 of the items 140 if donated.

At 207, a price 115 may be determined for buying or selling the one or more items 140 based on the potential tax deduction value 107. For example, the price determination application 100 may determine a suggested sale price 115 according to the equation=>price=potential tax deduction value to the seller+(tax deduction value to a potential buyer−tax deduction value to the seller)/2. For example, if the items 140 to be donated would provide a $100 tax deduction to the seller 101 and a $200 tax deduction to a potential buyer 103, the suggested price 115 may be $150. Other price equations are also contemplated. In some embodiments, the price determination application 100 may provide a price 115 to a potential buyer 103. For example, the price determination application 100 may determine a suggested buy price 115 according to the equation=>price=potential tax deduction value to the buyer −(tax deduction value to the buyer−potential tax deduction value to the seller)/2. In some embodiments, the price 115 may be provided for a hypothetical seller or buyer. For example, census information may be used to determine tax information 150 for an average seller/buyer in a provided tax bracket. In some embodiments, a seller 101/buyer 103 may provide hypothetical tax information 150 to the price determination application 100 to make a price determination.

In some embodiments, the price determination application 100 may have access to tax information 150 from both the seller 101 and the buyer 103 and may be able to determine a suggested transaction price 115 based on the potential tax deduction values 107 to both the buyer 103 and the seller 101. For example, the price determination application 100 may provide tax return preparation services to sellers 101 and buyers 103 through a network 105 and, therefore, may have access to tax information from both the seller 101 and buyer 103. In some embodiments, the price determination application 100 may be part of an electronic marketplace 300 used for buyers 103 and sellers 101 of donatable items 140. Other embodiments of the price determination application 100 are also contemplated.

FIGS. 3a-d illustrate interactions between buyers 103 and sellers 101 through the electronic marketplace 300, according to an embodiment. In some embodiments, sellers 101 (e.g., sellers 101a-b) and buyers 103 (e.g., buyers 103a-b) may interact with an electronic marketplace 300 to buy/sell items 140 to donate for tax deductions. In some embodiments, sellers 101 and buyers 103 may use the electronic marketplace 300 to take advantage of the differences in tax deduction values of donations for entities in different tax brackets. The electronic marketplace 300 may display items 140 and/or itemizations 350, receive bids from and/or determine distributions of the items to buyers 103, arrange sales of the items 140 from sellers 101 to buyers 103, and arrange donations of the items 140, on behalf of the buyer 103, for tax deductions. In some embodiments, the items 140 may not be delivered to the buyer 103 by the seller 101, but may instead be routed, after ownership is transferred to the buyer 103, to a qualified tax deduction organization 370 for donation in the buyer's name.

In some embodiments, the sellers 101 and the buyers 103 may interact with the electronic marketplace 300 (e.g., operating on a remote server) through network 105 (e.g., the Internet). For example, the sellers 101 and/or buyers 103 may interact with the electronic marketplace 300 through a web application (e.g., a web browser). Other networks are also contemplated. In some embodiments, the electronic marketplace 300 may work in conjunction with software executing locally on a seller and/or buyer's local computer. For example, sellers 101 may itemize their donatable items 140 through the price determination application 100 (which may be part of a tax return preparation application 111) executing on the seller's local computer. The itemization 350 may then be uploaded to the electronic marketplace 300 (and stored, for example in an itemization database 330 in an information storage system 320 communicably coupled to the electronic marketplace 300). A buyer 103 may download a displayed itemization 350 (e.g., displayed through the electronic marketplace 300) to the price determination application 100 executing on the buyer's local computer. The price determination application 100 may calculate (based on tax information from the buyer 103) the approximate tax deduction value 107 of the items 140 on the itemization 350 as a donation. In some embodiments, the sellers 101 and/or buyers 103 may interact with the electronic marketplace 300 without having the price determination application 100 executing locally. In some embodiments, the price determination application 100 may be part of the electronic marketplace 300. For example, the itemizations 350 may be provided directly to the electronic marketplace 300 by the seller 101 through a web page of the electronic marketplace 300 and the electronic marketplace 300 may determine and display itemizations 350, tax deduction values 107, prices 115, etc. through the web page to buyers 103. Other processing distributions are also contemplated. In some embodiments, the electronic marketplace 300 may include other services (e.g., a tax return preparation service, online auction service, etc).

Figure 4:
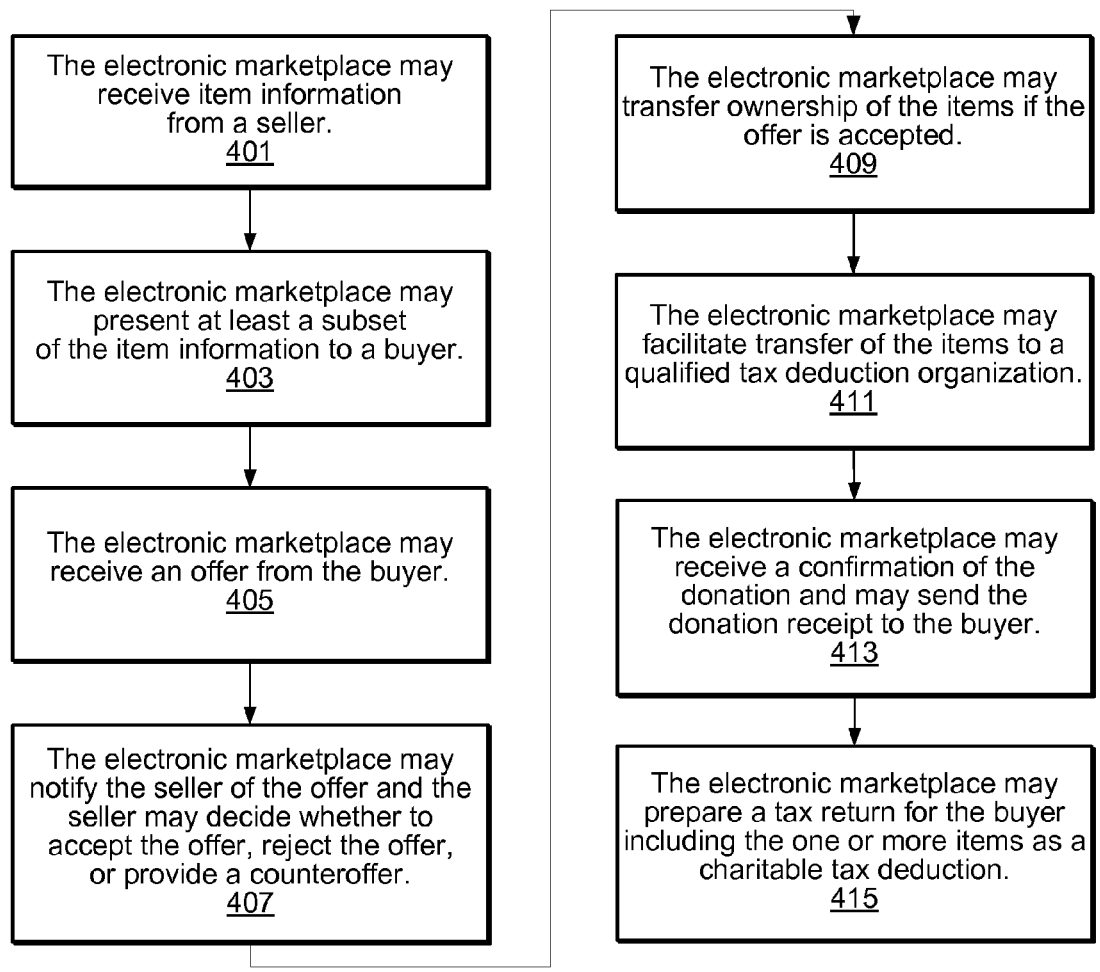
FIG. 4 illustrates a flowchart of an embodiment for an electronic marketplace.

FIG. 4 illustrates a flowchart of an embodiment for an electronic marketplace 300, according to an embodiment. FIGS. 3a-d illustrate interactions between buyers 103 and sellers 101 through the electronic marketplace 300, according to an embodiment. It should be noted that in various embodiments of the methods described below, one or more of the elements described may be performed concurrently, in a different order than shown, or may be omitted entirely. Other additional elements may also be performed as desired.

At 401, the electronic marketplace 300 may receive item information 151 from a seller 101 for one or more items 140. In some embodiments, the seller 101 may manually provide the item information 151 (e.g., through user interface 701 and/or web application). In some embodiments, the seller 101 may provide item information 151 through a network connection to the electronic marketplace 300 from, for example, price determination application 100 (e.g., executing locally on the seller's computer). Other sources of item information 151 are also contemplated. In some embodiments, the electronic marketplace 300, receiving item information 151, may also be an entity that specializes in tax deductions and/or a charitable organization (other entities are also contemplated).

In some embodiments, the item information 151 may include the actual item 140 (e.g., which may be delivered to the electronic marketplace 300 by the seller 101). The items 140 may be delivered to a physical location (e.g., an item drop-off location), and the seller 101 may receive compensation for the items 140 after the items 140 are sold and/or donated. The physical location may be an entity that specializes in tax deductions and/or may include a charitable organization. Other physical locations are also contemplated. In some embodiments, the entity may use a local electronic marketplace to process the items 140.

In some embodiments, the seller 101 and/or price determination application 100 may itemize the item information 151. For example, the price determination application 100 may assign an identifier 505 (e.g., see FIG. 5) to one or more items 140 and include an approximate market value 507 for the identified one or more items 140. In some embodiments, the electronic marketplace 300 may itemize the item information 151 received from the sellers 101. Other sources of itemization 350 are also contemplated. In some embodiments, items 140 may be managed separately (e.g., according to seller 101) and/or may be grouped together (e.g., several items from multiple sellers 101 may be grouped together for sale). In some embodiments, the electronic marketplace 300 may standardize the received item information 151 by assigning identifiers 505 to the items 140 and/or determining approximate market values 507 of one or more of the items 140. Other itemization configurations are also contemplated. In some embodiments, market values 507 may be assigned to items 140 using an application-based appraisal (e.g., ItsDeductable™) and/or published charts/listings of approximate market values 507. Other sources of market values 507 are also contemplated (e.g., online auction site valuations associated with similar recently auctioned items). In some embodiments, the itemizations 350 may be stored in an itemization database 330 accessible to the electronic marketplace 300.

At 403, the electronic marketplace 300 may present at least a subset of the item information 151 (e.g., in the form of an itemization 350) to buyer 103. In some embodiments, the electronic marketplace 300 may notify the buyer 103 of a potential transaction with a seller 101 by providing the buyer 103 with the respective item information 151 for consideration by the buyer 103. For example, the electronic marketplace 300 (and/or the price determination application 100 executing in conjunction with the electronic marketplace 300) may automatically present one or more itemizations 350 (e.g., previously received from a seller 101) to the buyer 103 for potential purchase (e.g., based on tax information 150 provided by the buyer 103). In some embodiments, the itemizations 350 may be presented to the buyer 103 when the buyer 103 logs into the price determination application 100 and/or electronic marketplace 300 or, for example, at a certain point in a tax return preparation session. Other presentation times are also contemplated.

In some embodiments, the buyer 103 may perform a search of the itemization database 330 to find one or more items 140 to potentially purchase for a tax deduction. In some embodiments, the buyer 103 may provide information (e.g., tax information 150) to a user interface 701 of the electronic marketplace 300 for use in searching for appropriate itemizations 350. In some embodiments, the electronic marketplace 300 may perform a search for itemizations 350 appropriate for the buyer 103 (e.g., as determined by tax information 150 provided by the buyer 103). Appropriate itemizations 350 may include itemizations 350 that are within a reasonable buying ability of the buyer 103 (e.g., as determined by yearly salary) but not small enough to be a nuisance to the buyer 103 (e.g., as determined by a minimum value entered by the buyer 103). In some embodiments, the buyer 103 may provide maximum and minimum values and/or other search criteria for the itemization search. Other searches and search criteria are also contemplated. In some embodiments, the item information 151 may be stored and/or searched in forms other than itemizations 350.

In some embodiments, presenting an itemization 350 to the buyer 103 may include presenting several itemizations 350 and/or their respective cumulative itemization market values 605 (e.g., sum of the market values of the items 140 in respective itemizations 350). For example, as seen in FIG. 6, the electronic marketplace 300 may determine one or more cumulative itemization market values 605 and may present (e.g., through display 501 which may present a website) several cumulative itemizations 603 as separate listings 609 to a buyer 103. In some embodiments, the cumulative itemization market values 605 may be calculated and returned after a search of the itemization database 330. The respective itemization 350 for one or more cumulative itemizations 603 may also be presented to buyers 103. For example, the buyer 103 may click on (e.g., by moving a graphical cursor and clicking a computer mouse button) one or more cumulative itemizations 603 (which may be hyperlinked) to see the associated itemization 350. Other presentation formats are also contemplated.

In some embodiments, a price determination application 100 in the electronic marketplace 300 may automatically determine the approximate tax deduction value of the items 140 in the itemization 350 and a suggested price 115 for the buyer 103 (e.g., see display 501). In some embodiments, the buyer 103 may provide the itemization information (e.g., the cumulative itemization 603 with associated cumulative market value 605) to a local price determination application 100 to determine approximately the value of the tax deduction 107 to the buyer 103 if the buyer were to donate the items 140 associated with the respective itemization 350. In some embodiments, the buyer 103 may manually enter (e.g., via a keyboard) the itemization information into the price determination application 100 or the itemization information may be downloaded to the price determination application 100 from the electronic marketplace 300. The local price determination application 100 may use past and/or current tax information 150 for the buyer 103 to determine the approximate tax deduction value of the items 140 in the itemization 350 and a suggested price 115 for the buyer 103.

At 405, the electronic marketplace 300 may receive an offer 331 from the buyer 103 for at least one presented item (e.g., as represented in an itemization 350). In some embodiments, the offer 331 may be based on a suggested price 115 determined by the price determination application 100. For example, the suggested price 115 may be less than the tax deduction value 107 of the item 140 to the buyer 103, but, for example, more than the tax deduction value 107 of the item 140 to the seller 101. In some embodiments, the electronic marketplace 300 may calculate the price 115 to use as the offer 331 for an itemization 350, and the buyer 103 may indicate whether the buyer 103 accepts the offer 331. For example, the calculated offer 331 may be displayed next to a respective itemization 350, and the buyer 103 may choose to accept the offer 331 or present a counter offer.

In some embodiments, the electronic marketplace 300 may receive information from sellers 101 to determine an approximate tax deduction value 107 of their respective items 140. In some embodiments, the approximate tax deduction value 107 may be used to determine a minimum acceptable offer 331 for the respective items 140 (e.g., to use as a reserve price in an auction of the items 140). In some embodiments, the minimum acceptable offer 331 may be presented to the buyers 103 and/or may be used by the electronic marketplace 300 to reject buyer offers 331 that are less than the minimum acceptable offers 331 (e.g., without notifying the seller 101). In some embodiments, acceptable offers 331 may be determined by the price determination application 100 and may be displayed by the electronic marketplace 300 next to the relevant itemization 350. For example, the price determination application 100 may determine an acceptable price 115 according to the equation=>acceptable price=tax deduction value to the seller+(tax deduction value to buyer−tax deduction value to the seller)/2. For example, if the items 140 to be donated would provide a $100 tax deduction to the seller 101 and a $200 tax deduction to the buyer 103, the acceptable price 115 may be set at $150. Other acceptable price equations are also contemplated. In some embodiments, the buyer 103 may provide a counter offer to the calculated price 115.

In some embodiments, the electronic marketplace 300 may receive multiple offers 331 (e.g., from multiple buyers 103) through an auction format (e.g., an online auction hosted by the electronic marketplace 300) for an item 140 and/or itemization 350. The online auction may have a duration set by the electronic marketplace 300 and/or by the associated seller 101. In some embodiments, the seller 101 may provide other characteristics for the auction (e.g., minimum offer, etc.). In some embodiments, the auction may be advertised (e.g., through web ads, pop-ups, etc.). In some embodiments, the auction may have a duration of several days or weeks to allow buyers 103 to discover the auction over time (e.g., through searches of the itemizations 350 in the itemization database 330). In some embodiments, the electronic marketplace 300 may present the winning offer 331 to the respective seller 101 at the conclusion of the auction. In some embodiments, the electronic marketplace 300 may be dedicated to item auctions for item donations. In some embodiments, the electronic marketplace 300 may be a general online website that uses the price determination application 100 to present a potential seller 101 or buyer 103 with tax deduction values 107 and/or suggested prices 115 for the seller 101/buyer 103 for items 140 presented on the online website in general auctions. Other auction formats are also contemplated (e.g., phone in auctions, silent auctions, etc.)

At 407, the electronic marketplace 300 may notify the seller 101 of the offer 331 and the seller 101 may decide whether to accept the offer, reject the offer, or provide a counteroffer 335. In some embodiments, the price determination application 100 may provide the seller 101 with a suggested price 115 for the items being offered by the seller 101. The seller 101 may consider the suggested price 115 when determining whether to accept the offer 331. In some embodiments, the seller 101 may view offers 331 as they are received in an auction and may preemptively reject offers 331 prior to the close of the auction. For example, the seller 101 may reject an offer 331 from a buyer 103 with an unfavorable reputation. In some embodiments, the seller 101 may set criteria for offers 331 to accept in an auction (e.g., buyer 103 must reside in the same state, etc.) The acceptance, rejection, or counteroffer 335 may be provided to the buyer 103 through the electronic marketplace 300. In some embodiments, the buyer 103 and seller 101 may continue negotiating through the electronic marketplace 300 (e.g., by sending offers 331 and counteroffers back and forth) until a final acceptance or final rejection is reached.

At 409, the electronic marketplace 300 may transfer ownership 375 of the items 140 to the buyer 103 making the offer 331 if the offer 331 is accepted by the seller 101. In some embodiments, the electronic marketplace 300 may transfer a payment 380 from the buyer 103 along with the buyer's identify 360. The seller 101 may transfer the ownership 375 of the items 140 to the buyer 103. For example, the seller 101 or electronic marketplace 300 may provide the buyer 103 with an itemized receipt (other ownership transfer mechanisms are also contemplated). In some embodiments, the payment 380 for the items 140 may be delivered to the seller 101 (or divided among multiple sellers 101 according to market value of the items 140 provided by the respective sellers 101 if the payment is for items 140 from multiple sellers 101). In some embodiments, the electronic marketplace 300 may take a percentage of the payment 380 and/or charge the buyer 103 or seller 101 for providing the service.

At 411, the electronic marketplace 300 may facilitate transfer of the items 140 to a qualified tax deduction organization 370. In some embodiments, the qualified tax deduction organization 370 may be notified of a buyer's identity 360 as a donation source of the donated presented item. In some embodiments, buyer 103 may specify the qualified tax deduction organization 370 for the donation. In some embodiments, the seller 101 may specify the qualified tax deduction organization 370 that will receive the items 140. In some embodiments, the identity of the preferred qualified tax deduction organization 370 may be provided by the buyer 103 as part of the offer 331. In some embodiments, the seller 101 may provide the qualified tax deduction organization 370 for donation as part of the itemization 350. In some embodiments, the electronic marketplace 300 may designate the qualified tax deduction organization 370. For example, the electronic marketplace 300 may be a qualified tax deduction organization 370. Other sources of the qualified tax deduction organization 370 are also contemplated.

At 413, a confirmation may be received that the one or more items 140 have been donated to qualified tax deduction organization 370 and the donation receipt 390 may be sent to the buyer 103. A donation receipt 390 for the items 140 may be provided to the buyer 103. In some embodiments, the electronic marketplace 300 may facilitate transfer of the donation receipt 390 or the donation receipt 390 may be sent directly to the buyer 103 from the qualified tax deduction organization 370. The buyer 103 may then claim a corresponding deduction on the buyer's tax return (e.g., state and/or federal tax return).

At 415, the electronic marketplace (and/or corresponding price determination application 100) may prepare a tax return for the buyer 103 including the donation of the one or more items 140 as a charitable tax deduction. In some embodiments, if the electronic marketplace 300 is preparing the tax return for the buyer 103, the electronic marketplace 300 may add the deduction to the buyer's tax return and/or retain the donation receipt 390.

FIG. 7 illustrates a user interface 701, according to an embodiment. In some embodiments, a seller 101 and/or buyer 103 may interface with the electronic marketplace 300 through a user interface (e.g., user interface 701). The user interface 701 may provide tabs 703, 705 which may have corresponding subtabs (e.g., subtab 707). Users (e.g., sellers 101 and/or buyer 103) may navigate through the user interface panels associated with the tabs by selecting one or more main tabs and sub tabs. Users may also progress through the tabs in order (e.g., as presented by the electronic marketplace 300). In some embodiments, the user may skip 719 a panel or go back 727 to a previous panel. The user interface 701 may be used by a seller 101 to provide item information 151 at 723, 725, upload a listing (e.g., through graphical upload buttons 721), provide tax information 150, accept/reject an offer 331, present a counteroffer, etc. In some embodiments, the buyer 103 may use the user interface 701 to conduct a search of the itemizations 350, provide tax information 150, provide an offer 331, etc. Other user interfaces and user interface options are also contemplated. In some embodiments, the user interface 701 may be presented as part of a web application or another application executing on a user's local computer. Other user interface sources are also contemplated.

In some embodiments, groups of items 140 may be bought and/or sold among a plurality of sellers 101 and buyers 103. For example, an item distribution service 800 may receive items 140 from multiple sellers 101 and determine prices 115 and a distribution of the items 140 for multiple buyers 103 that may result in an overall tax deduction for the items 140 that is greater than if the items 140 were donated by the original sellers 101.

Figure 8:
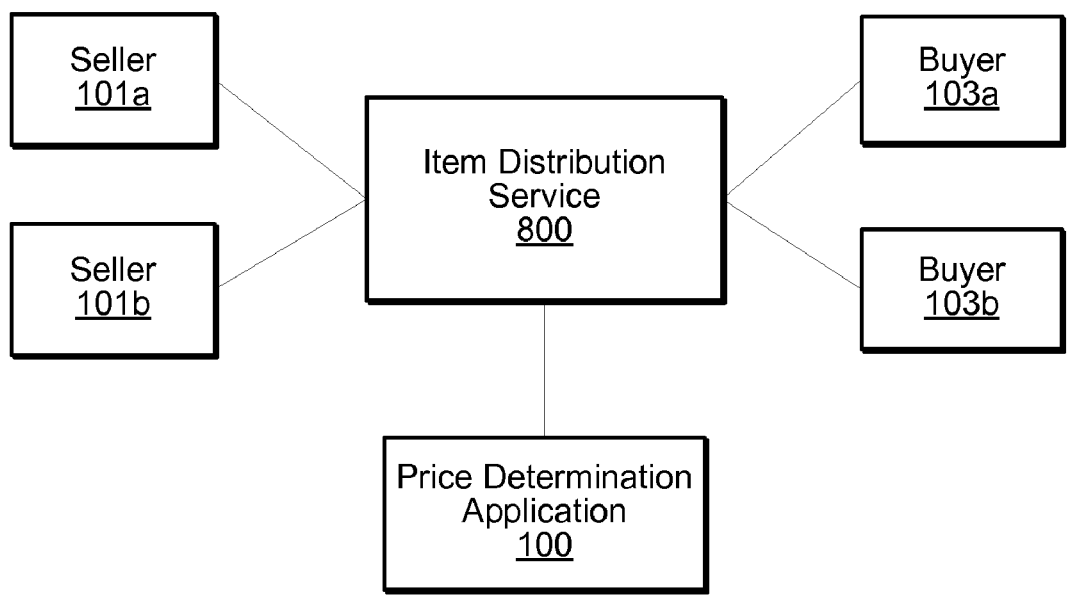
FIG. 8 illustrates an item distribution service, according to an embodiment.
Figures 9A, 9B:
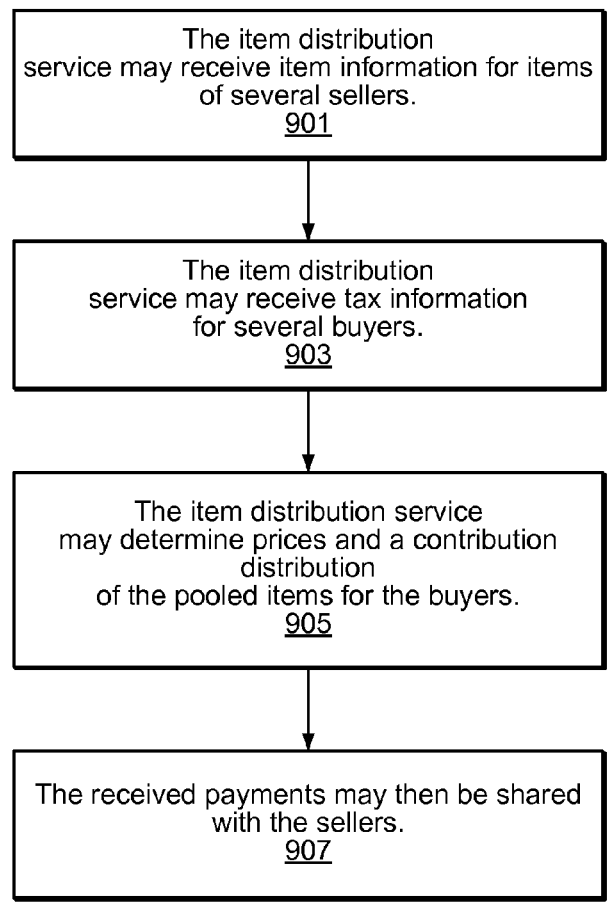
FIG. 9a illustrates a flowchart of a method for determining a contribution distribution in the item distribution service, according to an embodiment.
FIG. 9b illustrates a chart for determining a contribution distribution in an item distribution service, according to an embodiment.

FIG. 9a illustrates a flowchart of a method for determining a contribution distribution in the item distribution service 800 (e.g., seen in FIG. 8), according to an embodiment. It should be noted that in various embodiments of the methods described below, one or more of the elements described may be performed concurrently, in a different order than shown, or may be omitted entirely. Other additional elements may also be performed as desired.

At 901, the item distribution service 800 (e.g., operating with an electronic marketplace 300 and/or price determination application 100) may receive item information 151 for items 140 of several sellers 101. For example, the sellers 101 may submit items 140 (e.g., physically deliver the items 140) to a pool of items 140 and the pool of items 140 may be managed (e.g., sorted and/or itemized) at a physical location. In some embodiments, the sellers 101 may submit item information 151 (e.g., by uploading an itemization 350) and the item distribution service 800 may pool and manage the item information 151 of several sellers 103.

At 903, the electronic marketplace 300 may receive tax information 150 for several buyers 103 (and/or sellers 101). The tax information 150 may be used by the item distribution service 800 to determine an approximate tax deduction value of one or more items 140 (if donated) to a buyer 103 (and/or seller 101). For example, the tax information 150 may include tax information 150 for past or current tax returns. Other tax information 150 and sources of tax information 150 is also contemplated (e.g., the buyer 103 and/or seller 101 may fill out an application form). In some embodiments, the item distribution service 800 that is pooling the items 140 and/or item information 151 may also provide tax return preparation services to the sellers 101 and/or buyers 103. Other services are also contemplated (e.g., the item distribution service 800 may also provide an online auction service). In some embodiments, the items 140 listed in the itemizations 350 may have an approximate first total tax deduction value to the sellers 101 submitting the items 140.

At 905, the item distribution service 800 may determine a contribution distribution of the pooled items 140 for at least a subset of the plurality of buyers 103 (and/or sellers) that results in an approximate second total tax deduction value to the subset of buyers 103 (and/or sellers 101) that is greater than the approximate first total tax deduction value. For example, items 140 from the pooled items 140 may be distributed (e.g., sold) to buyers 103 in a higher tax bracket than the sellers 101 submitting the items 140.

In some embodiments, the price determination application 100 may determine potential tax deduction values 107 to the sellers 103 and/or buyers 101 and may use the potential tax deduction values 107 to determine prices 115 to use in sales of the items 140 to respective buyers 103. For example, the price 115 of an item 140 may be set above a potential tax deduction value 107 of the item 140 to the seller 101 and below the potential tax deduction value 107 of the item to the buyer 103. In some embodiments, the price 115 may be set halfway between the potential tax deduction value 107 of the item 140 to the seller 101 and the potential tax deduction value 107 of the item to the buyer 103. In some embodiments, the price 115 may be set closer to the potential tax deduction value 107 of the item 140 to the seller 101 or the potential tax deduction value 107 of the item to the buyer 103 (e.g., according to an agreement between the item distribution service 800 and the seller 101 or buyer 103).

In some embodiments, the prices 115/distributions may be determined according to respective tax brackets, amount of tax deductions, etc. In some embodiments, the item distribution service 800 may consider potential alternate minimum tax (AMT) considerations for the buyers 103 when determining prices 115/distributions of the items 140. For example, putting all of the items 140 in the name of the highest tax bracket buyer 103 may result in the buyer 103 paying more in taxes (through the AMT) than if fewer items 140 were provided for the buyer 103 to donate. Other buyers 103 may then be chosen to donate one or more items 140. For example, the item distribution service 800 may consider the potential tax deduction values 107 of various items 140 to multiple buyers (e.g., see the chart in FIG. 9b). As shown in the chart, if the tax deduction values 107 of Item 1 to respective buyers are $W>$J>$A, Buyer 3 may be chosen as the buyer for Item 1. Similarly, if after Item 1 is sold to Buyer 3, the tax deduction values 107 of Item 2 to respective buyers are $K>$X>$B, Buyer 2 may be chosen as the buyer for Item 2 (e.g., Buyer 3 may trigger AMT with another deduction). In some embodiments, several distributions of sales of Items 1,2,3 to Buyers 1,2,3 may be determined in order to find the distribution that maximizes the tax deduction value of the items 140 to the buyers 103. Other distribution determinations are also contemplated.

When the prices 115 and/or distribution are determined, the items 140 may be sold to the higher tax bracket buyers 103 according to the determined prices 115 and distributions. The buyers 103 may provide payment for the items 140 and ownership of the respective items 140 may be transferred to the respective buyers 103. In some embodiments, the buyers 103 (and/or sellers 101) may not be aware of the transaction at the time of the transaction. For example, the item distribution service 800 may sell items 140 to the respective buyer 103 and place a charge on the buyer's bill. The charge may be offset by a tax deduction received for the donation of the items 140. The buyer 103 may receive an itemized receipt of the transactions after the distributions and donations are completed. In some embodiments, the buyers 103 may be actively aware of the transactions (e.g., the buyers 103 may approve the sale prior to completion of the sale).

In some embodiments, the item distribution service 800 may receive the items 140 from the sellers 103 and perform the contribution distribution once. In some embodiments, the item distribution service 800 may receive the items 140 from sellers 103 and perform the contribution distribution and donation on a periodic basis (e.g., once a week).

At 907, the payments received from the buyers 103 may then be shared with the sellers 101. For example, the sellers 101 may receive a portion of the received price for selling the items to the buyers 103 that is proportional to the market value of the items 140 provided by the respective seller 101. In some embodiments, the item distribution service 800 may charge a fee for performing the distribution. In some embodiments, the fee may be based on a percentage (e.g., 5%) of the received payments. Other percentages are also contemplated. Other fee structures are also contemplated.

Figure 10:
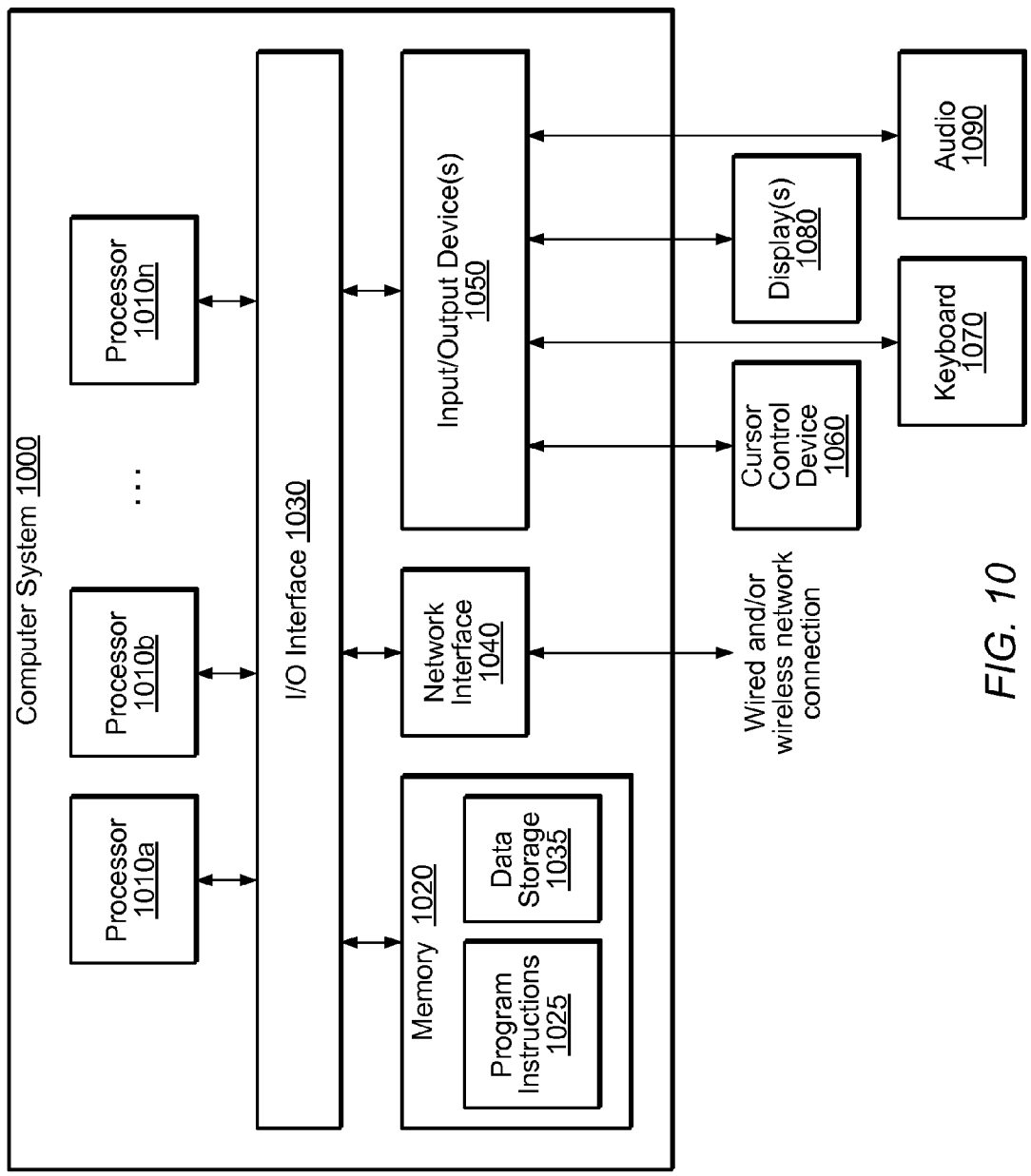
FIG. 10 illustrates a system for implementing the price determination application, electronic marketplace, and/or item distribution service, according to an embodiment.

FIG. 10 illustrates a system for implementing the price determination application 100, electronic marketplace 300, and/or item distribution service 1000 (collectively referred to herein as "tax deduction service applications"), according to an embodiment. Various components of embodiments of the tax deduction service applications as described herein may be executed on one or more computer systems, which may interact with various other devices. One such computer system is illustrated by FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 910 may be general-purpose or embedded processors implementing any of a variety of instruction set architectures (ISAs), such as the x86, PowerPC, Scalable Processor Architecture (SPARC), or Microprocessor without Interlocked Pipeline Stages (MIPS) ISAs, or any other suitable ISA. In multiprocessor systems, each of processors 1010 may commonly, but not necessarily, implement the same ISA.

System memory 1020 may be configured to store program instructions and/or information accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and information implementing desired functions, such as those described above for the tax deduction service applications, are shown stored within system memory 1020 as program instructions 1025 and information storage 1035, respectively. In other embodiments, program instructions and/or information may be received, sent or stored upon different types of computer-access media or on similar media separate from system memory 1020 or computer system 1000. Generally speaking, a computer-accessible medium may include storage media or memory media such as magnetic or optical media, e.g., disk or Compact Disc/Digital Versatile Disc-Read-Only Memory (CD/DVD-ROM) coupled to computer system 1000 via Input/Output (I/O) interface 1030.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other information transformations to convert information signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow information to be exchanged between computer system 1000 and other devices attached to a network, such as other computer systems, or between nodes of computer system 1000. In various embodiments, network interface 1040 may support communication via wired or wireless general information networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 1050 may, in some embodiments, include one or more display terminals 1080, keyboards 1070, keypads, touchpads, scanning devices, voice or optical recognition devices, or any other devices suitable for entering or retrieving information by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement at least a portion of embodiments of the tax deduction service applications as described herein, and information storage 1035, comprising various documents, tables, databases, etc. accessible by program instructions 1025. In one embodiment, program instructions 1025 may include software elements of the electronic marketplace 300 illustrated in the Figures, and information storage 1035 may include information used in embodiments of the tax deduction service applications. In other embodiments, different software elements and information may be included.

Those skilled in the art will appreciate that computer system 1000 is merely illustrative and is not intended to limit the scope of the tax deduction service applications as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and information integrity. Alternatively, in other embodiments some or all of the software components may execute in memory on another device and communicate with the illustrated computer system via inter-computer communication. Some or all of the system components may also be stored (e.g., as instructions or structured information) on a computer-accessible medium or a portable article to be read by an appropriate drive, various examples of which are described above. Various embodiments may further include receiving, sending or storing instructions and/or information implemented in accordance with the foregoing description upon a computer-accessible medium. Accordingly, the present invention may be practiced with other computer system configurations.

Various embodiments may further include receiving, sending or storing instructions and/or information implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
one or more processors; and
a memory coupled to the one or more processors and storing program instructions, wherein the program instructions are executable by the one or more processors to:
obtain tax information for a user;
determine a tax bracket for the user based on the tax information;
obtain a plurality of item information for an item;
determine a market value for the item based on the plurality of item information;
calculate a potential tax deduction value associated with claiming the item as a charitable donation on a tax return for the user,
wherein the potential tax deduction value is a tax savings available to the user upon the user claiming a charitable donation of the item on a tax return for the user, and
wherein the potential tax deduction value is based on the tax bracket and the market value;
determine, using a price determination application, a suggested sale price for selling the items based on the potential tax deduction value, wherein the suggested sale price is greater than the potential tax deduction value; and
post a listing for selling the item using an electronic marketplace, wherein the listing comprises the plurality of item information and the suggested sale price.

2. The system as recited in claim 1, wherein the program instructions are further executable to:
generate the listing for the user on the electronic marketplace to sell the item.

3. The system as recited in claim 2, wherein the electronic marketplace is an auction website, and wherein the program instructions are further executable to:
set the suggested sale price as a reserve price for an auction of the item.

4. The system as recited in claim 1, wherein the program instructions executable for obtaining tax information for the user further comprise program instructions to:
access tax information for the user using a tax return preparation application used by the user to generate a tax return.

5. A computer-implemented method, comprising:
obtaining, by a processor, tax information for a user;
determining, by the processor, a tax bracket for the user based on the tax information;
obtaining, by the processor, a plurality of item information for an item;
determining, by the processor, a market value for the item based on the plurality of item information;
calculating, by the processor, a potential tax deduction value associated with the user claiming the item as a charitable donation on a tax return for the user,
wherein the potential tax deduction value is a tax savings available to the user upon the user claiming a charitable donation of the item on a tax return for the user, and
wherein the potential tax deduction value is based on the tax bracket and the market value;
determining, by the processor using a price determination application, a suggested sale price for selling the item based on the potential tax deduction value, wherein the suggested sale price is greater than the potential tax deduction value; and
posting, by the processor, a listing for the sale of the item using an electronic market place, wherein the listing comprises the item information and the suggested sale price.

6. The method as recited in claim 5, further comprising:
generating, by the processor, the listing for the user on the electronic marketplace to sell the item.

7. The method as recited in claim 6, wherein the electronic marketplace is an auction website, and wherein the method further comprises:
setting, by the processor, the suggested sale price as a reserve price for an auction of the item.

8. A computer-readable storage medium, storing program instructions computer-executable to:
obtain tax information for a user;
determine a tax bracket for the user based on the tax information;
obtain a plurality of item information for an item;
determine a market value for the item based on the plurality of item information;
calculate a potential tax deduction value associated with claiming the item as a charitable donation on a tax return for the user,
wherein the potential tax deduction value is a tax savings available to the user upon the user claiming a charitable donation of the item on a tax return for the user, and
wherein the potential tax deduction value is based on the tax bracket and the market value;
determine, using a price determination application, a suggested sale price for selling the item based on the potential tax deduction value, wherein the suggested sale price is greater than the potential tax deduction value; and
post a listing for selling the item using an electronic marketplace, wherein the listing comprises the plurality of item information and the suggested sale price.

9. The computer-readable storage medium as recited in claim 8, wherein the program instructions are further executable to:

generate the listing for the user on the electronic marketplace to sell the item.

10. The computer-readable storage medium as recited in claim 9, wherein the electronic marketplace is an auction website, and wherein the program instructions are further executable to:

set the suggested sale price as a reserve price for an auction of the item.

* * * * *

UNITED STATES PATENT AND TRADEMARK OFFICE
CERTIFICATE OF CORRECTION

| | | |
|---|---|---|
| PATENT NO. | : 7,970,658 B1 | Page 1 of 1 |
| APPLICATION NO. | : 11/961786 | |
| DATED | : June 28, 2011 | |
| INVENTOR(S) | : Todd Matthew Fitch et al. | |

It is certified that error appears in the above-identified patent and that said Letters Patent is hereby corrected as shown below:

IN THE CLAIMS:

In Column 15, line 52, Claim 1, the word "items" should be replaced with --item--.

Signed and Sealed this
Third Day of January, 2012

David J. Kappos
*Director of the United States Patent and Trademark Office*